US009549218B2

(12) United States Patent
Rowland

(10) Patent No.: US 9,549,218 B2
(45) Date of Patent: Jan. 17, 2017

(54) MULTI-PLATFORM TELEVISION EPISODE PRODUCTION PROCESS

(76) Inventor: Hilary Rowland, New York, NY (US)

( * ) Notice: Subject to any disclaimer, the term of this patent is extended or adjusted under 35 U.S.C. 154(b) by 618 days.

(21) Appl. No.: 12/938,854

(22) Filed: Nov. 3, 2010

(65) Prior Publication Data

US 2012/0110607 A1 May 3, 2012

(51) Int. Cl.
H04N 7/16 (2011.01)
H04N 21/472 (2011.01)
H04N 21/258 (2011.01)
H04N 21/475 (2011.01)
H04H 60/33 (2008.01)
H04H 60/66 (2008.01)

(52) U.S. Cl.
CPC .. H04N 21/47205 (2013.01); H04N 21/25891 (2013.01); H04N 21/4756 (2013.01); H04N 21/4758 (2013.01); H04H 60/33 (2013.01); H04H 60/66 (2013.01)

(58) Field of Classification Search
USPC .......................................................... 725/8, 9
See application file for complete search history.

(56) References Cited

U.S. PATENT DOCUMENTS

2002/0178442 A1* 11/2002 Williams ........................ 725/13
2003/0196198 A1* 10/2003 Broussard et al. ............. 725/24
2004/0078314 A1* 4/2004 Maerz et al. ................... 705/36
2005/0132420 A1* 6/2005 Howard et al. ............... 725/135
2007/0156507 A1* 7/2007 Connelly et al. ............... 705/10
2010/0161384 A1* 6/2010 Wells ............................... 705/10
2011/0119595 A1* 5/2011 Bydeley et al. .............. 715/738

FOREIGN PATENT DOCUMENTS

WO WO 2007/081698 A2 7/2007

OTHER PUBLICATIONS

Examination Report from GB1119014.7 dated Aug. 27, 2015.

* cited by examiner

Primary Examiner — Michael Hong
(74) Attorney, Agent, or Firm — Blank Rome LLP

(57) ABSTRACT

A multi-platform television production process that results in an almost completely viewer-guided television episode. The production process begins at an online website where criteria for a first portion of the episode are selected by the public. Production commences on this portion of the episode, based on the criterion chosen by the online users, and the first portion of the episode is aired online. Viewers of this online airing of the initial production of the episode provide feedback on the first portion of the episode and are able to vote on criteria for the second portion of the episode. The second portion of the episode is produced, based on the criterion chosen by viewers. Then, the full episode, incorporating viewer feedback received during the production process) is aired on television. The full episode may also include content received from the online viewers.

15 Claims, 4 Drawing Sheets

MULTI-PLATFORM TELEVISION EPISODE PRODUCTION PROCESS

FIELD OF THE INVENTION

This application relates to the production of television episodes, and specifically to a production process which integrates an online platform and viewer feedback with traditional television production and broadcasting methods.

BACKGROUND

Television programs have been a popular form of entertainment for decades; however, the advent of the Internet is affecting their popularity. With the increasing popularity of the Internet, television networks have noticed increased competition from other forms of entertainment, as opposed to the competition being limited to that from other competing television networks. More and more Americans are looking to the World Wide Web to fulfill their desire for entertainment, drastically reducing ratings and causing shows to be canceled. This change in the public's viewing habits is not only affecting television stations, production companies, and actors, but advertising agencies as well. With new technologies such as the digital video recorder (DVR), Netflix® (and other internet movie rental companies), and on-demand television, the television viewing public is no longer "forced" to watch television commercials, which were once the primary medium for advertising during a television show. In response, advertising agencies are increasingly focusing on the Internet as their primary medium of exchange and promotion of products.

Traditionally, television episodes are produced, filmed and broadcast without the opinions of the viewing public. This typical production process 100 is illustrated in FIG. 1. At step S11, the production and filming is completed on the full episode. Then, at step S12, the completed episode is aired on television. Finally, at step S13, feedback is received through ratings and reviews. A major disadvantage of production process 100 is that the production of an episode is based solely on the ideas and opinions of producers, directors, and writers and this production fails to integrate any feedback from the viewing public until after the money has been spent on the entire production process and the show has aired. There is no opportunity after airing of the episode to go back and change the episode based on the feedback received at step S13 of the process 100. Other disadvantages of this typical production process 100 include an audience that is restricted to those with availability during the scheduled air time of the episode; a viewing public does not feel a sense of ownership over the final product, resulting in a lower probability of them making time to watch the program; and advertising that is limited to television commercials and brand placement within the episode, which may be less effective than other forms of advertising as previously noted.

In response to the increased competition and other disadvantages faced by the traditional production methods, many television programs have evolved to more interactive models that include viewer feedback, integrated advertising and informational websites. One such example is the popular television program American Idol® which encourages higher ratings through audience interaction in the form of voting. The production process 200 of such an integrated reality TV show is illustrated in FIG. 2. At step S21, the production and filming is completed on the first half (Part 1) of each episode. Then, at step S22, the first half (Part 1) of the episode is aired on television. Either during or after airing, viewers are able to vote, for example for winners, via telephone, text messages or online, at step S23. Finally, at step S24, the winners (which are a result of the viewing voting) are announced during a live "results" show which is aired later, typically the next night. This production process 200 still includes the disadvantages of production process 100 of an audience that is restricted to those with availability during the scheduled air time of the episode and advertising that is mainly limited to television commercials and brand placement within the episode, which may be less effective than other forms of advertising as previously noted.

Although some viewer interaction is available via the production process 200 illustrated in FIG. 2, these currently available television production processes 100, 200 fail to adequately integrate the viewing public, provide a sense of ownership or take advantage of the unique exposure provided by the World Wide Web. Further, there are currently no television programs that have based the entire production of a television episode around viewer interaction.

BRIEF DESCRIPTION OF THE DRAWINGS

The disclosed embodiments will be described in the following on the basis of example embodiments which will be explained in greater detail with reference to the enclosed drawings.

DETAILED DESCRIPTION

In the following detailed description, reference is made to the accompanying drawings which form a part hereof, and in which are shown by way of illustration specific embodiments that may be practiced. It should be understood that like reference numbers represent like elements throughout the drawings. These example embodiments are described in sufficient detail to enable those skilled in the art to practice them. It is to be understood that other embodiments may be utilized, and that changes may be made, without departing from the scope of the invention, only some of which are discussed in detail below.

The disclosed embodiments relate to a multi-platform television episode production process that utilizes the popularity and viral nature of the Internet in the process of television episode production, in order to forego the aforementioned shortcomings of the currently available production processes.

Figure 3:
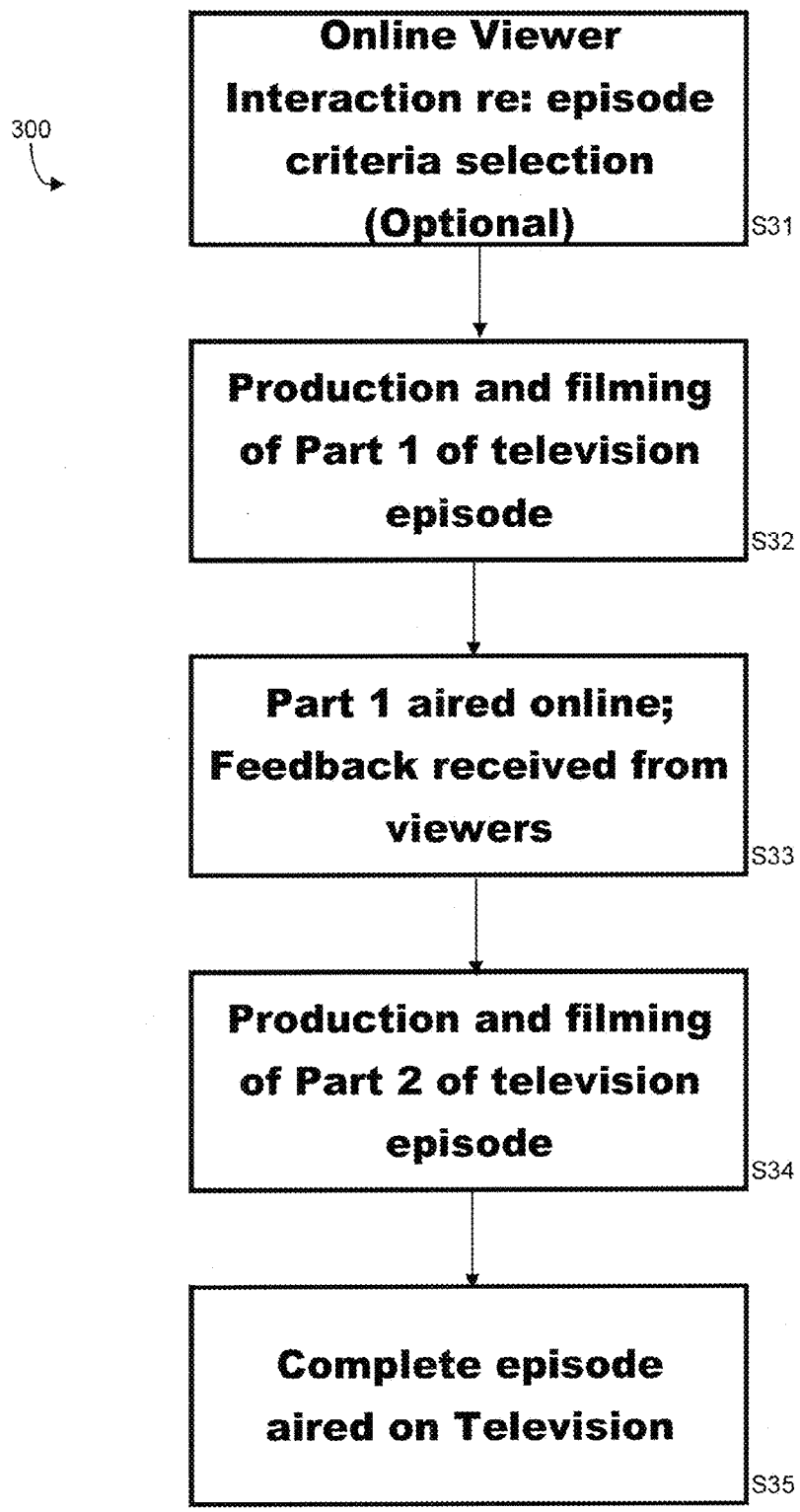
FIG. 3 illustrates a television production process in accordance with disclosed embodiments.

A process 300 according to an example embodiment is illustrated in FIG. 3. At optional step S31, the production process 300 for the television show is launched via an online website. In this step, criteria for the first portion (Part 1) of the episode may be selected by the public. This may be implemented, for example, by an online voting system where people can come to the website and vote on various features of the television show. For reality television programs, these features may include, for example, voting on contestants or challenges. For non-reality television, these features may include, for example, choosing the characters that will be featured on the show, the actors that will play the parts, or the storyline for the episode. The voting may be for a preset group of options or may be open ended; however it is likely easier to implement the results arising from a preset group of options. Alternatively, this pre-production online viewer interaction to select initial episode criteria may be omitted and episode criteria selection may be done by the producers or writers of the show, as in for example a normal television production process.

Next, at step S32, production commences on this portion (Part 1) of the episode, based on the criterion chosen by the online users in step S31 (or if step S31 is omitted, as selected by the producers and/or writers). At step S33, the first portion (Part 1) of the episode is aired online. Viewers of this online airing of the initial production of the episode are able to provide feedback on the first portion (Part 1) of the episode (via video messages, emails, instant messages, or various other forms of messaging via the Internet) and are able to vote on criteria for the second portion (Part 2) of the episode.

Then, at step S34, the second portion (Part 2) of the episode is produced, based on the criterion chosen by viewers in step S33. This step S34 may also include changes to the first portion (Part 1) of the episode, based on the viewer's comments and feedback. Finally, at step S35, the full episode is aired on television. Alternatively, the full episode may be aired online as well. During airing, the full episode includes the first portion (Part 1) of the episode, as updated if applicable, and the second portion (Part 2) of the episode. The television airing of the full episode may also include content received from the online viewers during step S33, such as, for example, voting results and/or video feedback from fans.

Figure 4:
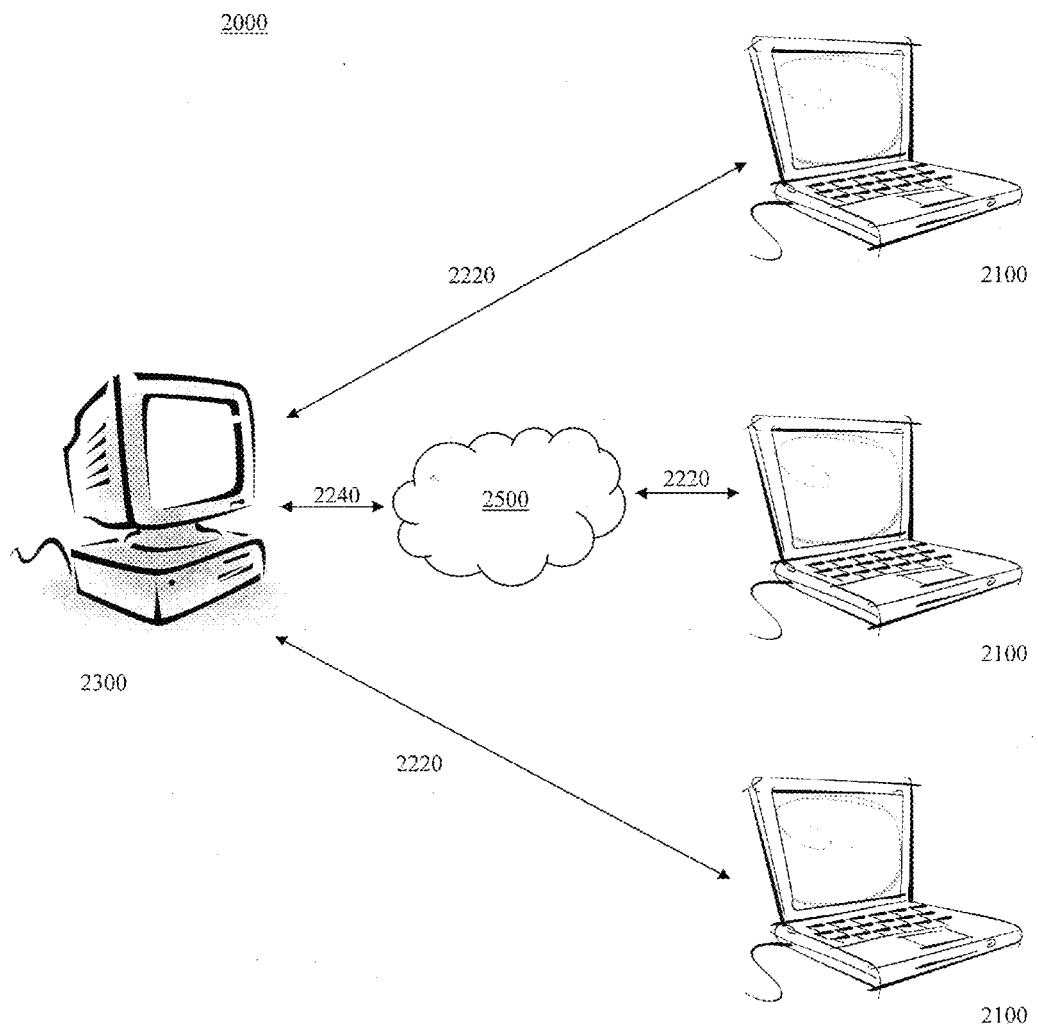
FIG. 4 is a system for implementing the television production process of the disclosed embodiments.

As mentioned, the multi-platform television episode production process 300 may be implemented via computers over the Internet. Referring to FIG. 4, an example embodiment of a system 2000 that may be used to implement the method illustrated in FIG. 3 is shown. The method of FIG. 3 utilizes a production-side server computer 2300 which is capable of receiving communications and information with a plurality of individual desktop computers 2100 of viewers via the Internet 2500. As seen in FIG. 4, the plurality of individual desktop computers 2100 and the production-side server computer 2300 are coupled over communication links 2220, 2240, respectively to the Internet 2500. Alternatively, the Internet connection could be implemented using a wide area network (WAN), or a local area network (LAN). The communication links 2220, 2240 may be provided as a dedicated hardwired link or a wireless link. Although the communication links 2220, 2240 are shown as a single data link, they may also be implemented as multiple data links.

The individual desktop computers 2100 of viewers allow the viewers to access a production website and provide feedback and vote on the various aspects of the production, as discussed previously. The production-side server computer 2300 allows production staff to provide and update content on the production website as well as to receive the feedback/votes provided by the viewers. The individual desktop computers 2100 and production-side server computer 2300 may be any type of computer that provides the view with an Internet connection and the ability to view and input information and is not limited to a desktop computer. In the example embodiment, the individual desktop computers 2100 and production-side server computer 2300 include a processor, memory, user interface and a display, as well as Web browser software (such as Internet Explorer™, Netscape™, Firefox™, Safari™ or other Web browser loaded into memory or readily-available for download from the Internet). Such browsers retrieve Web pages from a Web server in response to inputs on user interface. Web pages are loaded into memory and then rendered on display. Software on the individual desktop computers 2100 and production-side server computer 2300 may additionally include an email client for sending and receiving email.

The user interface may comprise controls that are preferably graphically represented buttons, with symbols commonly found in many Web pages to permit entry of information or selection of actions. User interface controls may include a keyboard, mouse or other pointing device, or other information or control input device that affects the operation, of individual desktop computers 2100 and production-side server computer 2300, as is well known in the art.

The display may comprise a CRT (cathode ray tube) or LCD (liquid crystal display), or other visual display device as is commonly known in the art. Display may further comprise speakers that receive digitized audio signals and emit audio output audible to the user.

The functions performed by the single production-side server computer 2300 shown in FIG. 4 may be split among several server computers. Furthermore, these servers may be geographically separated and, for example, coupled through Internet 2500.

In addition, production-side server computer 2300 includes a memory 2400 that includes show production information and information received from the viewers via the individual desktop computers 2100 over the Internet 2500. A memory server application 2420 is coupled to database 2400 and provides an interface to the information stored in memory 2400 to other application software modules that execute on the production-side server computer 2300. Memory 2400 may be a database, for example.

Figure 1:
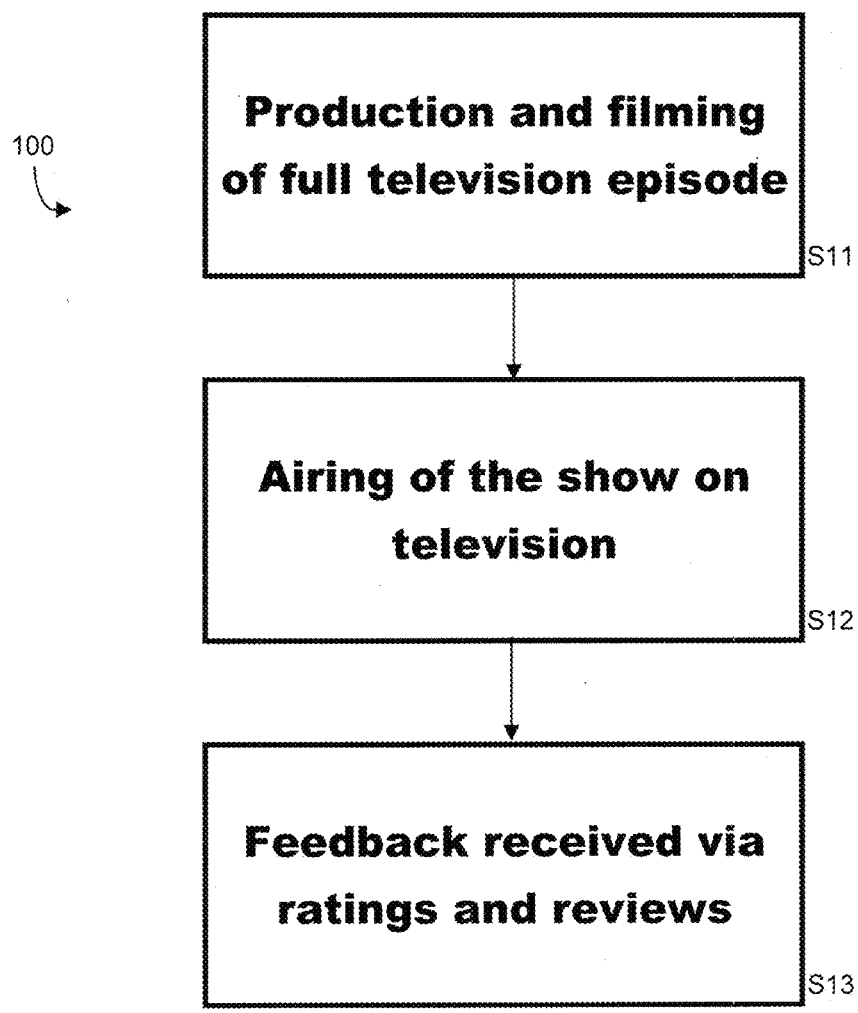
FIG. 1 illustrates a prior art television production process.
Figure 2:
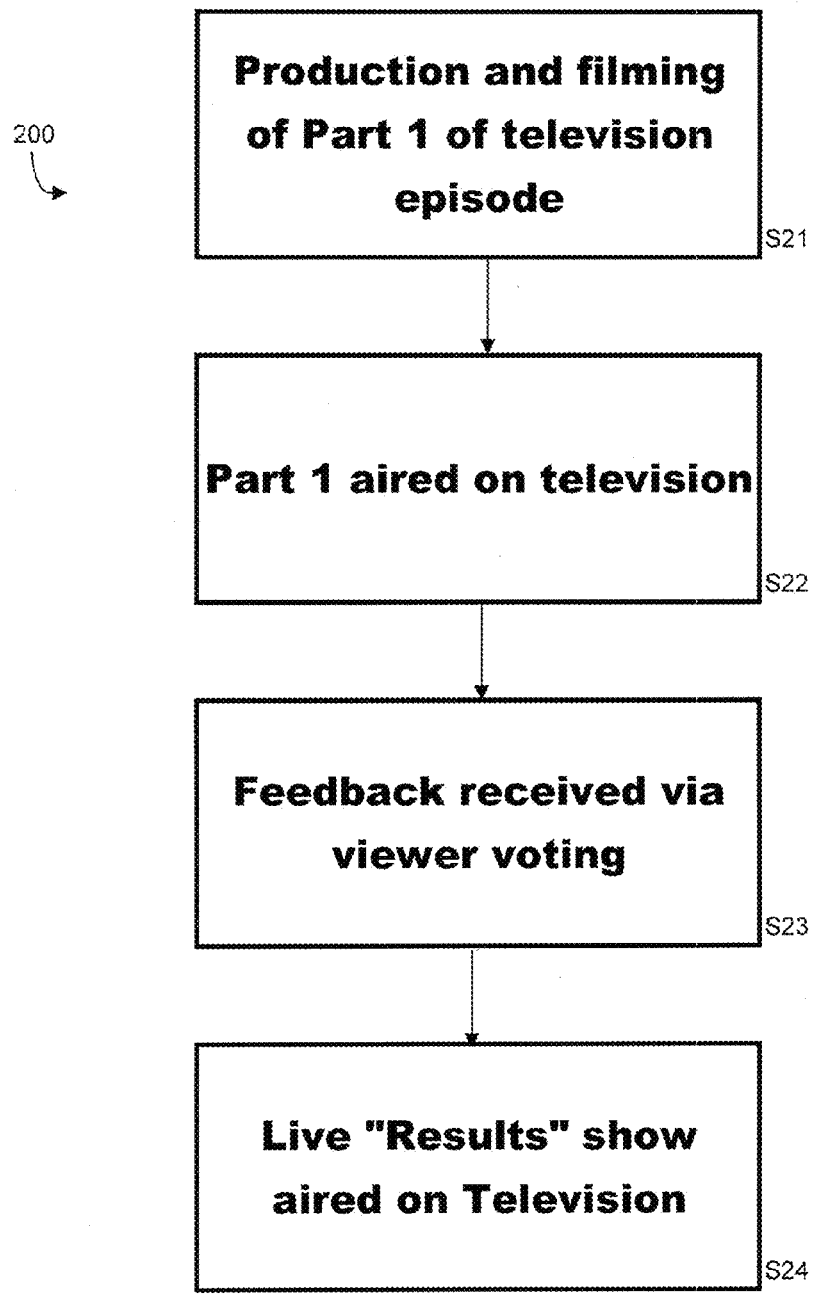
FIG. 2 illustrates another prior art television production process.

As described, the multi-platform television episode production process 300, described above with respect to FIG. 3, takes place both online and in the television studio, in an alternating manner. This varies from the traditional episode production process 100, shown in FIG. 1, in that feedback is received intermittently throughout the production process 300 rather than being provided only at the end, via reviews and ratings, in step S13 of process 100. This also varies from the slightly interactive production process 200, shown in FIG. 2, in that feedback in the process 300 is not limited to a small time window of voting with a "live" results episode being aired the next night as it is in process 200. Instead, the first and second portions (Parts 1 and 2) of an episode produced using the production process 300 of the example embodiment are aired on television in the same time slot, on the same night and is able to incorporate the viewer feedback into the episode itself. Thus, a follow-up "results" show is not necessary.

Thus, the production process 300 according to the example embodiment involves much more integration of viewer opinion (as compared to the prior art production processes 100, 200) by taking it into account during multiple steps of the production process. This is immensely beneficial in that it provides feedback throughout the production process to ensure the most viewer-friendly episode is produced. Also, ratings for the resulting full television episode will likely improve—not only due to a viewer-favored outcome, but also because viewers will also develop a sense of ownership over the episode and, thus, will make sure to tune in to see if their views were shared by the majority or to see if their video feedback was incorporated into the episode. The production process of the disclosed embodiments also provides more flexibility for viewers, due to the online content, viewable at their leisure, rather than just time-constricted television content.

Another distinct advantage of the production process of the disclosed embodiments is the increased opportunities for advertising based on the dual-platform production. This will make it easier to secure advertising sponsorship for a new television show; since advertising is utilized both online and on air, increased exposure for the advertising sponsors is achieved.

The above description and drawings should only be considered illustrative of example embodiments that achieve the features and advantages described herein. Modification and substitutions to specific process conditions and structures can be made. Accordingly, the claimed invention is not to be considered as being limited by the foregoing description and drawings, but is only limited by the scope of the appended claims.

What is claimed as new and desired to be protected by Letters Patent of the United States is:

1. A television production method, comprising:
   airing a first segment of a television episode only on Internet-connected devices;
   subsequently, receiving feedback from viewers regarding the first segment of the television episode, the feedback being received via the Internet-connected devices; and
   after receiving the feedback from the viewers, airing a complete version of the television episode, wherein the complete version of the television episode includes a final version of the first segment of the television episode and an additional second segment of the television episode; and
   wherein the feedback received from the viewers includes (1) voting on criteria for the second segment of the television episode and (2) comments from the viewers regarding the first segment of the television episode;
   wherein details regarding the second segment of the television episode are based on the feedback received from the viewers regarding the first segment; and
   wherein the television production method further comprises the steps of producing and filming the second segment of the television episode, and wherein the step of filming the second segment occurs subsequent to the step of airing the first segment, and subsequent to the step of receiving the feedback from the viewers regarding the first segment, such that the criteria for the second segment of the television episode are received from the viewers before the filming of the second segment, and wherein the step of filming the second segment of the television episode is responsive to the voting on the criteria for the second segment, and occurs after receipt of the comments regarding the first segment of the television episode, such that the details regarding the second segment of the television episode are determined after the step of receiving the feedback from the viewers regarding the first segment.

2. The television production method of claim 1, further comprising receiving feedback from viewers prior to filming and/or production of the first segment of the television episode.

3. The television production method of claim 1, wherein the feedback received from viewers regarding the first segment of the television episode is in the form of at least one of voting, text message, video message, email and instant message.

4. The television production method of claim 1, wherein the final version of the first segment of the television episode is different than a test run of the first segment of the television episode, and wherein the first segment of the television episode is changed to the final version of the first segment of the television episode based on the feedback received from viewers regarding the first segment.

5. The television production method of claim 1, wherein the complete version of the television episode further includes content received from viewers as the feedback received from viewers regarding the first segment.

6. The television production method of claim 1, wherein the method is implemented using a device connected to the Internet.

7. The television production method of claim 1, wherein the television show is a reality television show.

8. The television production method of claim 1, wherein the television show is a non-reality television show.

9. The television production method of claim 1, wherein the final version of the first segment of the television episode aired in the complete version of the television episode is the same as a test run of the first segment of the television episode.

10. The television production method of claim 1, wherein the complete version of the television episode is aired on television at a different time than when the first segment of the television episode is aired on the Internet-connected devices.

11. The television production method of claim 1, wherein the complete version of the television episode is aired on television after the first segment of the television episode is aired on the Internet-connected devices.

12. The television production method of claim 2, wherein details regarding the first segment of the television episode are based on the feedback received from viewers prior to filming and/or production of the first segment.

13. The television production method of claim 2, wherein the feedback received from viewers prior to filming and/or production of the first segment of the television episode includes voting on at least one of contestants, challenges, characters, actors and storylines.

14. The television production method of claim 5, wherein the viewer content included in the complete version of the television episode includes at least one of voting results and video feedback.

15. A production method, comprising:
   airing a first segment of an episode only on Internet-connected devices;
   subsequently, receiving feedback from viewers regarding the first segment of the episode, the feedback being received via the Internet-connected devices; and
   after receiving the feedback from the viewers, airing a complete version of the episode,
   wherein the complete version of the episode includes a final version of the first segment of the episode and an additional second segment of the episode; and
   wherein the feedback received from the viewers includes (1) voting on criteria for the second segment of the television episode and (2) comments from the viewers regarding the first segment of the episode;
   wherein details regarding the second segment of the episode are based on the feedback received from the viewers regarding the first segment; and
   wherein the production method further comprises the steps of producing and filming the second segment of the episode, and wherein the step of filming the second segment occurs subsequent to the step of airing the first segment, and subsequent to the step of receiving the feedback from the viewers regarding the first segment, such that the criteria for the second segment of the episode are received from the viewers before the filming of the second segment, and wherein the step of filming the second segment of the episode is responsive to the voting on the criteria for the second segment, and occurs after receipt of the comments regarding the first segment of the episode, such that the details regarding the second segment of the episode are determined after the step of receiving the feedback from the viewers regarding the first segment.

\* \* \* \* \*